March 4, 1941.  M. SEGRE  2,233,458

CLAMPING DEVICE

Filed April 17, 1940

Massimo Segre
INVENTOR.

BY Edgar Luzzatto

AGENT

Patented Mar. 4, 1941

2,233,458

UNITED STATES PATENT OFFICE 2,233,458

CLAMPING DEVICE

Massimo Segre, New York, N. Y.

Application April 17, 1940, Serial No. 330,080

4 Claims. (Cl. 287—54)

This invention relates to clamping devices for releasably connecting elements of scaffolding or like temporary structures in fixed positioned relationship.

An object of my invention is to provide a device of this kind which is economical to manufacture, quick and easy to mount and release, and capable of securely bearing very heavy loads. I attain this object thanks to a novel and improved construction whereby the number of parts composing the device is reduced to a minimum, machining operations are almost completely eliminated, and the distribution of stresses is such that no section is dangerously strained even under the most severe static conditions.

Another object of my invention is to provide a clamp for securing together two scaffolding elements which can be clamped on both elements with one and the same motion and which therefore comprises only one screw or other locking member, and yet can be mounted on one of said scaffolding elements in the absence of the other and left thereon during the erection of the scaffolding without the danger that it may slide off or otherwise collapse.

Other objects and advantages of my invention will become apparent as the description proceeds. The appended drawing illustrates a preferred embodiment of my invention adapted to secure two tubular or cylindric scaffolding elements at right angles to each other, but it is to be understood that my invention can be applied to structures differing from the one herein illustrated without any modification or with such modifications only as will readily suggest themselves to any person skilled in the construction of this type of devices.

In particular, the scaffolding elements need not be tubular or cylindric; obvious variations in the design of the clamp will be sufficient to adapt it to elliptical or polygonal sections and in general to any shape found in practice. Moreover, the angle of the two elements connected by the clamp may be different from 90°, and the clamp is easily adapted to this case as will hereinafter be pointed out.

Figure 1:
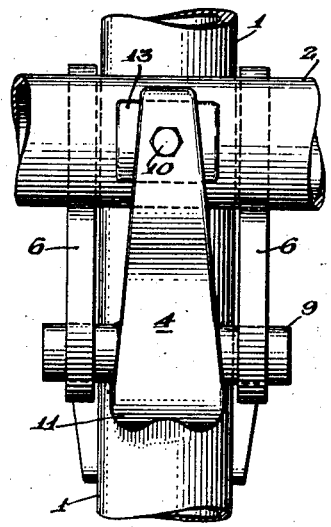
Fig. 1 is an end elevation of a preferred embodiment of my invention.

Referring now to the drawing, my clamp comprises two main parts, the forked member 3 and the lever 4. The fork 3 comprises a saddle-shaped portion 5, which fits the tube 1 and embraces an angle not greater than 180°, and two flat lateral branches 6. These lateral branches are preferably thicker than the saddle 5 because they have to bear a severer stress, as will hereafter become apparent; and each of them has a substantially semi-circular recess 7 which serves as a seat for the tube 2, and another recess in the hook-shaped lower portion thereof which is engaged by the lugs 9 of the lever 4. Said recesses 8 are of such a shape that said lugs 9 can be slipped in and out thereby allowing the fork 3 to be separated from the other parts of the device during the mounting thereof on the scaffolding.

Figure 2:
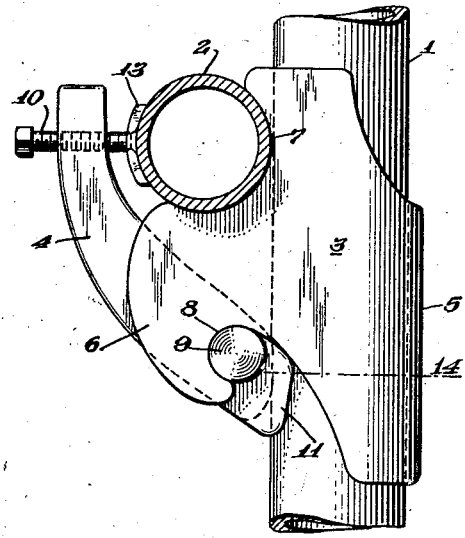
Fig. 2 is a side elevation thereof.
Figure 4:
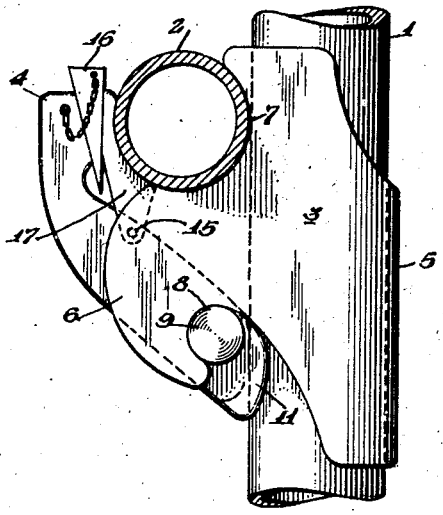
Fig. 4 is a side elevation of a modified form of my clamp.

In Figs. 2 and 4 the fork 3 is shown to have a special shape wherein the saddle 5 is considerably lower than the branches 6. A considerable portion of the saddle 5 extends below a plane, denoted in said figures by the numeral 14, which is perpendicular to the axis of the tube 1 and contains the line of contact of the surface 12 and the surface of said tube 1. It will be explained later that the clamping pressure on the tube 1 is due mostly to said lower portion of the saddle 5; therefore, while the design of the fork 3 may vary somewhat in individual cases, it is always essential for the satisfactory operation of the clamp that the portion of the saddle which extends below the plane 14 be made sufficiently ample.

An important feature of the fork 3 is that it can be manufactured without machining operations; and this permits to obtain a considerable economy, whatever the metal and the mode of production chosen.

The seats 7 should not contact more than a half of the periphery of the tube 2, in order that said tube may be introduced therein with a lateral motion, that is a motion substantially perpendicular to the axis of said tube. The erection of the scaffolding is thereby facilitated.

Figure 3:
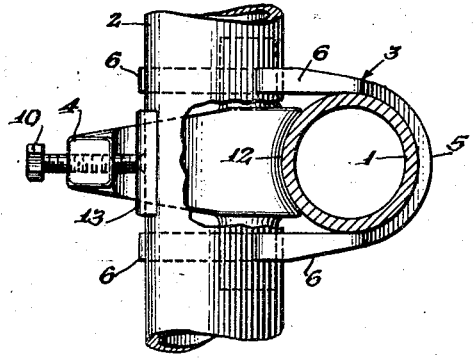
Fig. 3 is a plan view thereof, a portion of the tube 2 having been removed to show certain details of the clamp.

The lever 4 has, in the upper portion thereof, a screw thread engaged by the screw 10, and said lever ends with a cam-shaped portion 11 recessed as shown in Fig. 3 to provide a clamping surface 12 which matches the curvature of the tube 1. The lever 4 also carries two projecting cylindrical lugs or journals 9, already mentioned, about which, when the clamp has been assembled, said lever can swing. The lever, which is made preferably of the same metal of which the saddle is made, can be conveniently lightened by recessing it in the central portion thereof. The only machining operation required for the finishing of the lever 4 is the cutting of the screw thread.

Finally the clamp comprises locking means consisting in a screw 10 on the tip whereof is rotatably mounted a piece 13 whose purpose is to provide a clamping surface which will protect the surface of the tube 2 from being damaged by the pressure of the screw 10.

Fig. 4 illustrates a form of the device embodying two modifications, the parts which are not modified being indicated with the same numerals as the corresponding parts of Figs. 1 to 3.

The first modification relates to the locking member employed. In a broad sense it may be said that my clamp consists of two main pieces 3 and 4, already described, plus one, and only one, locking member. In Figs. 1 to 3, the locking member is a screw, and this will be in practice the most common case; but sometimes it may be desirable to use a wedge 16, as shown in Fig. 4, because it takes less time to drive down a wedge than to tighten a screw. The mechanical equivalence of these two locking members, so far as their operation in my clamp is concerned, is evident. It is also clear that other equivalent means might be used within the scope of my invention: therefore I will hereafter make frequent use of the generic expression "locking member."

The second modification found in Fig. 4 concerns a member which is interposed between locking member and tube 2 to prevent the latter's surface from being damaged by the clamping pressure. In Figs. 1 to 3 this intermediate member is mounted directly on the screw 10 and is denoted by the numeral 13; in the modified device of Fig. 4 the intermediate member is pivoted to the lever 4 and is denoted by the numeral 17; the pivot thereof is denoted by the numeral 15.

Details in the design of the intermediate member may vary in individual cases, especially in relation to the locking means adopted; and said member may also be altogether omitted without essentially changing the operation of the clamp.

The clamp is mounted on the scaffolding as follows. First, the fork 3, which has been separated from the other parts of the device, is slipped with a lateral motion onto the tube 1. The words "lateral motion" are used to denote a motion substantially perpendicular to the axis of the tube 1, and in the same sense the word "lateral" is employed throughout the following description and claims.

Then the lever 4 with the screw 10 is connected to the fork 3 by introducing the lugs 9 into their seats 8. The lever 4 behaves as a lever of the first order having its fulcrum at 9 and being free to swing thereabout. The centre of gravity of the lever is located in the part thereof which is opposite to the cam-shaped portion 11. Therefore, as soon as the lever 4 is in place, the weight thereof causes it to rotate about the lugs 9 until the clamping surface 12 rests lightly against the tube 1. The pressure due to this action is light, but sufficient to hold the device firmly in place during the erection of the scaffolding for such a length of time as it will be expedient so to leave it.

Thereafter the tube 2 is laid on the seats 7, which embrace it in such a way as to prevent any further displacement thereof. Finally, the screw 10 is tightened or the wedge 16 is driven downwardly.

The pressure of the locking member directly blocks the tube 2 between the seats 7 and the intermediate member 13 or 17 and is concurrently transmitted by the lever 4 to the clamping surface 12 thereof which squeezes the tube 1 against the saddle 5. In this way the clamp in one and the same movement is connected to both tubes. The static conditions of the whole assembly is excellent so that it can bear very heavy loads.

If it is desired to employ my clamp for connecting tubes or elements of a scaffolding structure which do not stand at right angles to each other, such as a vertical and a diagonal element of a structure, the fork 3 is modified by making one of the two recesses 7 lower than the other, so that the tube 2 in engaging said recesses will assume the desired inclination.

All the other parts of the device can be used interchangeably for all the different angles between the two scaffolding elements, without any modification; which is important from the standpoint of economy. My clamp however cannot be reversed, that is it cannot be used in a position wherein the concavity of the seats of the tube 2 is turned downwardly, as the center of gravity of the lever 4 must always be kept higher than the fulcrum 9 thereof.

It is desirable in practice to have all the parts of the clamp loosely connected together, for instance by means of small chains, one of them, not shown in the drawings, may connect one of the lugs 9 to an adjacent portion of the saddle, while another may connect the wedge, if there be one, to the lever. This latter is shown in Fig. 4.

Considering now the distribution of stresses throughout the clamp, it is seen that the clamping pressures on the member 13 (or 17) and the surface 12, which assure the clamping of the tube 2 and the tube 1 respectively, give rise to moments of opposite directions applied to the lever 4 which neutralize each other, so that an increase of the locking pressure on one of the two tubes automatically results in an increase of the locking pressure on the other and in a generally greater stability of the whole assembly.

The two pressures however combine to create a pull which is discharged on the lugs 9 and produces a shearing stress in the hook-shaped portions of the lateral branches of the fork 3 where the recesses 8 are located. To bear this shearing stress said branches are made rather thick, as previously noted.

While the pull of the lugs 9 on the fork 3 is directed toward the left, when the clamp is seen as in Figs. 2 and 4, the pressure of the tube 2 on the seats 7 thereof is directed toward the right. These two forces combined are equivalent to a leftward pull plus a clockwise couple and they are balanced by the pressure of the saddle 5 on the tube 1. The conditions of equilibrium require that the pressure of the saddle 5 on the tube 1 be so distributed that the resultant thereof lie in the plane 14, and this will happen if, and only if, the saddle 5 is sufficiently extended on both sides of said plane. If this condition is not fulfilled the clamp cannot remain in its normal position and tends to rotate in a clockwise direction with respect to the clamp, thus rendering the operation of the device highly unsatisfactory.

To keep the stress of the lugs 9 within satisfactory limits it is necessary that the weight of the tube 2 and the load thereof be supported entirely by the seats 7. For this reason, and also for convenience in the erection of the scaffolding, the seats 7 should contact substantially half of the periphery of the tube 2 so as to hold it in fixed positioned relationship to the tube 1. In said positioned relationship the two tubes are very near to each other, so that the size of the clamp is made as small as possible. However, they do not bear on each other, otherwise tube 2 would not be free to bear on seat 7 and the device could no longer operate in the manner described. It is to be noted that the diameter of the tubes cannot be regarded as exactly constant, but will vary to a certain extent from tube to tube.

It is seen that my clamp presents several important advantages. It is very cheap to manufacture, because it comprises a minimum number of parts and has only one locking member; also because the cutting of a screw thread is the only finishing operation required. It is simple and speedy to use, because both tubes can be introduced laterally therein and one movement clamps it concurrently on both tubes. It is safe, because not even a part of the load borne by the structure has an action which might tend to unlock the clamp or imperil the stability thereof; and because its design avoids any weak point or dangerous section.

While I have described a preferred embodiment of my invention, I do not want to be limited to the details herein set forth, as many variations are possible within the spirit of the invention and the scope of the appended claims.

I claim:

1. A clamping device for connecting two scaffolding elements together, comprising a saddle adapted to engage one scaffolding element and having seats therein to hold a second scaffolding element in fixed spaced relationship to the first; a lever loosely engaging said saddle; and a locking member cooperating with said seats to hold the second scaffolding element in gripping engagement and concurrently exerting a pressure on one end of said lever whereby the other end thereof is forced against the first scaffolding element and cooperates with said saddle to hold it in gripping engagement, said saddle engaging said first scaffolding element on both sides of the section thereof which is in contact with said lever.

2. A clamping device for connecting two scaffolding elements together, comprising a saddle adapted to engage one scaffolding element, said saddle having two branches and seats therein to hold a second scaffolding element in spaced positioned relationship to the first, the distance between said branches and the aperture of said seats being sufficient to allow of the lateral introduction of the scaffolding elements therein; a lever loosely engaging said saddle; and a locking member cooperating with said seats to hold the second scaffolding element in gripping engagement and concurrently forcing said lever to cooperate with said saddle to hold the first scaffolding element in gripping engagement; said saddle engaging said first scaffolding element on both sides of the section thereof which is in contact with said lever.

3. A clamping device for connecting two scaffolding elements together, comprising a saddle adapted to laterally engage one scaffolding element and having two spaced branches recessed to laterally engage a second scaffolding element; a lever having a pair of pin lugs detachably engaging a pair of recesses of said branches; and a locking member cooperating with said branches to grip the second scaffolding element and concurrently forcing said lever to swing about said lugs, bear on the first scaffolding element, and cooperate with said saddle to hold it in gripping engagement; said saddle engaging a portion of the first scaffolding element sufficiently extended on both sides of the section thereof on which said lever bears.

4. A scaffolding clamp comprising a saddle adapted to engage one scaffolding element and having two spaced branches recessed to provide seats for a second scaffolding element; a lever having a pair of pin lugs loosely journalled in said branches and a cam-shaped lower end recessed to provide a suitable clamping surface; said lever being top-heavy so that it swings about said lugs thereof and said clamping surface cooperates with said saddle to lightly grip the first scaffolding element as soon as the clamp is mounted thereon, holding the clamp in place; and a locking member cooperating with said branches to grip the second scaffolding element and concurrently forcing said lever to tighten the grip on the first scaffolding element; this latter being engaged by said saddle on both sides of the section on which said lever bears.

MASSIMO SEGRE.